(12) United States Patent
Reiber et al.

(10) Patent No.: US 7,337,900 B2
(45) Date of Patent: Mar. 4, 2008

(54) PACKAGING FOR WIDESCREEN WIPERS OF MOTOR VEHICLES

(75) Inventors: Bodo Reiber, Knittlingen (DE); Asmus Mueller, Karlsruhe (DE); Dieter Schoenlein, Horn-Bad Meinberg (DE)

(73) Assignee: Robert Bosch GmbH (DE)

( * ) Notice: Subject to any disclaimer, the term of this patent is extended or adjusted under 35 U.S.C. 154(b) by 394 days.

(21) Appl. No.: 10/513,557

(22) PCT Filed: May 27, 2003

(86) PCT No.: PCT/DE03/01721

§ 371 (c)(1), (2), (4) Date: Nov. 3, 2004

(87) PCT Pub. No.: WO03/101796

PCT Pub. Date: Dec. 11, 2003

(65) Prior Publication Data

US 2006/0163096 A1    Jul. 27, 2006

(30) Foreign Application Priority Data

Jun. 1, 2002  (DE) ................................ 102 24 431

(51) Int. Cl.
  *A45C 11/26* (2006.01)
  *B65D 73/00* (2006.01)
(52) U.S. Cl. ................ 206/349; 206/335; 206/470
(58) Field of Classification Search ................ 206/335, 206/349, 461, 470–471; 15/143.1, 245, 250.001
See application file for complete search history.

(56) References Cited

U.S. PATENT DOCUMENTS

| 3,199,563 | A | * | 8/1965 | Forrest ......................... 15/246 |
| 4,378,903 | A | * | 4/1983 | Sherwood .............. 229/117.18 |
| 5,379,896 | A | * | 1/1995 | Snow et al. ................. 206/470 |
| 5,899,334 | A | * | 5/1999 | Domerchie et al. ......... 206/470 |
| 6,276,529 | B1 | * | 8/2001 | Feehan, Jr. ................. 206/470 |
| 6,766,906 | B2 | * | 7/2004 | Charng ........................ 206/471 |
| 6,779,661 | B1 | * | 8/2004 | Kotlarski .................... 206/349 |
| 6,796,000 | B2 | * | 9/2004 | Varner ......................... 15/245 |
| 6,859,971 | B2 | * | 3/2005 | Siklosi ................. 15/250.001 |

FOREIGN PATENT DOCUMENTS

| DE | 23 26 093 A | 12/1974 |
| DE | 34 17 695 A | 11/1985 |
| DE | 196 41 042   | 4/1998 |
| DE | 197 29 864   | 1/1999 |
| DE | 199 51 971 A | 5/2001 |

* cited by examiner

*Primary Examiner*—Bryon P Gehman
(74) *Attorney, Agent, or Firm*—Michael Best & Friedrich LLP

(57) ABSTRACT

A package (25) for wiper blades (10) features a folded box (26) as well as an insert (32). In order to prevent the wiper blades (10) from abruptly relaxing during removal from the box (26), the insert (32) is embodied of a material whose flexural strength in the curvature direction of the wiper blades (10) is less than that of the wiper blades (10) so that when pulling the insert (32) out of the folded box (26), the wiper blades (10) continuously bend from their extended state in the folded box (26) into their curved shape in an unstressed state.

20 Claims, 2 Drawing Sheets

PACKAGING FOR WIDESCREEN WIPERS OF MOTOR VEHICLES

BACKGROUND OF THE INVENTION

The invention relates to packaging for a wiper blade for windows of motor vehicles.

This type of packaging is known from DE 199 51 971 A1. In the known packaging, a rigid component composed preferably of plastic is used into which the wiper blade can be inserted from the front side, whereby it is transferred from its curved position in an unstressed stated into an extended state. In addition, DE 199 51 971 A1 mentions using the component only as an extension aid whereby the component is then supposed to be accommodated in an additional receptacle. Disadvantageous in this case is that the packaging is relatively costly and expensive, particularly with respect to an additional receptacle. The required rigidity of the component also results in a relatively high weight of the component. In addition, handling requires some getting used to for the end user at least at the beginning, since he is not used to removing a wiper blade by pulling it out of the front side of a rail-shaped component.

SUMMARY OF THE INVENTION

The packaging in accordance with the invention for a wiper blade for windows of motor vehicles has the advantage that it permits simple handling for an end user with cost-effective manufacturability. In addition, the space requirements of the packaging as well as its weight are relatively low. According to the invention, this is accomplished in that the wiper blade together with an insert can be inserted into and removed from the packaging element and that the insert features a lower flexural strength in the curvature direction than the wiper blade. The special embodiment of the insert in particular keeps the wiper blade from abruptly relaxing during removal of the wiper blade from the front side of the packaging element, and instead, when pulling the wiper blade out, causes the wiper blade to be transferred continuously from its extended state in the packaging element into its curved state.

Advantageous further developments of the packaging for a wiper blade for windows of motor vehicles in accordance with the invention are disclosed in the sub-claims. A defined position of the wiper blade in the insert is achieved if the insert accommodates the wiper blade at least partially in a positively engaged manner.

In addition, it is especially advantageous if the insert surrounds the wiper strip at least partially so that the wiper strip is protected in the insert and is thereby arranged in the packaging.

The requirement of an at least partially positively engaged accommodation of the wiper blade as well as protection of the wiper strip permits can be realized in a particularly simple manner via a plastic part manufactured in a deep-drawing method, which can be manufactured very cost-effectively.

For economic and ecological reasons, it is also advantageous if the packaging element accommodating the wiper blade is embodied as a folded box.

Finally, secure and clear-cut handling when removing the wiper blade from the packaging is achieved if the insert accommodates the wiper blade in its longitudinal direction in an unmovable manner. In this case, it is guaranteed that when removing the wiper blade from the packaging, the wiper blade along with the insert are pulled jointly and uniformly out of the packaging so that a gradual transition of the wiper blade from its extended state into the curved state occurs.

BRIEF DESCRIPTION OF THE DRAWINGS

An exemplary embodiment of the invention is depicted in the drawings and is explained in more detail in the following. The drawings show.

DETAILED DESCRIPTION

Figure 1:
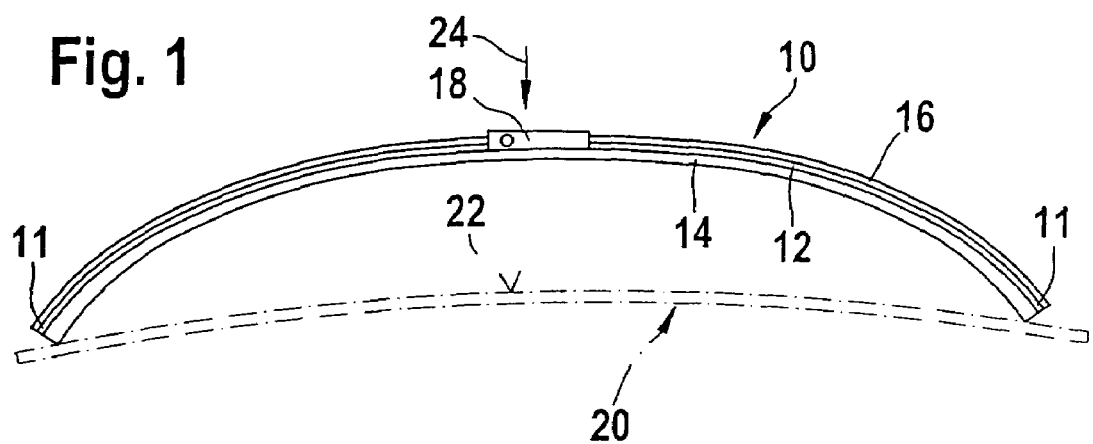
FIG. 1 A side view of a wiper blade in its unstressed state.
Figure 2:
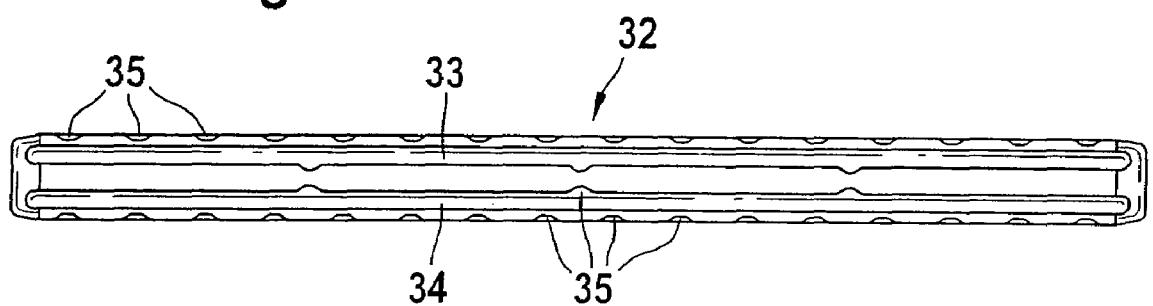
FIG. 2 A top view of an insert manufactured of plastic for two wiper blades.
Figure 3:
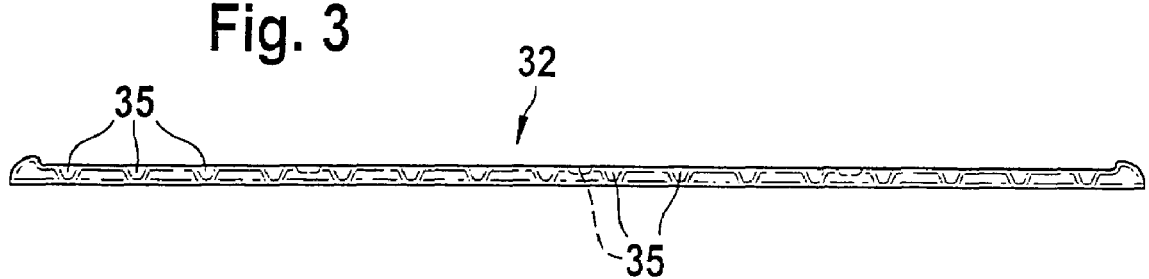
FIG. 3 A side view of the insert of FIG. 2.

A wiper blade 10 depicted in a side view in FIG. 1 has a long-stretched-out, rubber elastic wiper strip 12 whose wiper lip 14 can be placed on the to-be-wiped surface 22 of a motor vehicle window 20. The wiper strip 12 is held longitudinally axially parallel by a long-stretched-out, elastic supporting element 16 and together with this forms the wiper blade 10. Also a part of the wiper blade 10 is a connecting device 18, which can be used to connect the wiper blade 10 to a driven wiper arm (not shown). In addition, FIG. 1 shows the cross-section through the motor vehicle window 20 in a dash-dot line whose to-be-wiped surface 22 is facing the strip-like wiper lip 14 of the wiper blade 10. The wiper blade 10 is shown in a position in which it is completely unstressed and adjacent to the surface 22 of the motor vehicle window 20 only at its two ends 11. This shows that the wiper blade 10 has a greater curvature than the motor vehicle window 20. This curvature of the wiper blade 10 is attributable to a corresponding curvature of the supporting element 16. With respect to curvature of the wiper lip 14 that is brought about in this way, the supporting element 16 is arranged externally.

If, during the wiping operation, the wiper blade 10 is applied by the wiper arm in the direction of arrow 24 with its wiper lip 14 over the entire length to the motor vehicle window 20, the supporting element 16 that is now tensioned against the motor vehicle window 20 is responsible for a proper distribution of the application force (arrow 24). Additional details about a wiper blade 10 embodied in this way, which is known per se, are disclosed for example in DE 196 41 042 A1 or DE 197 29 864 A1.

Figure 4:
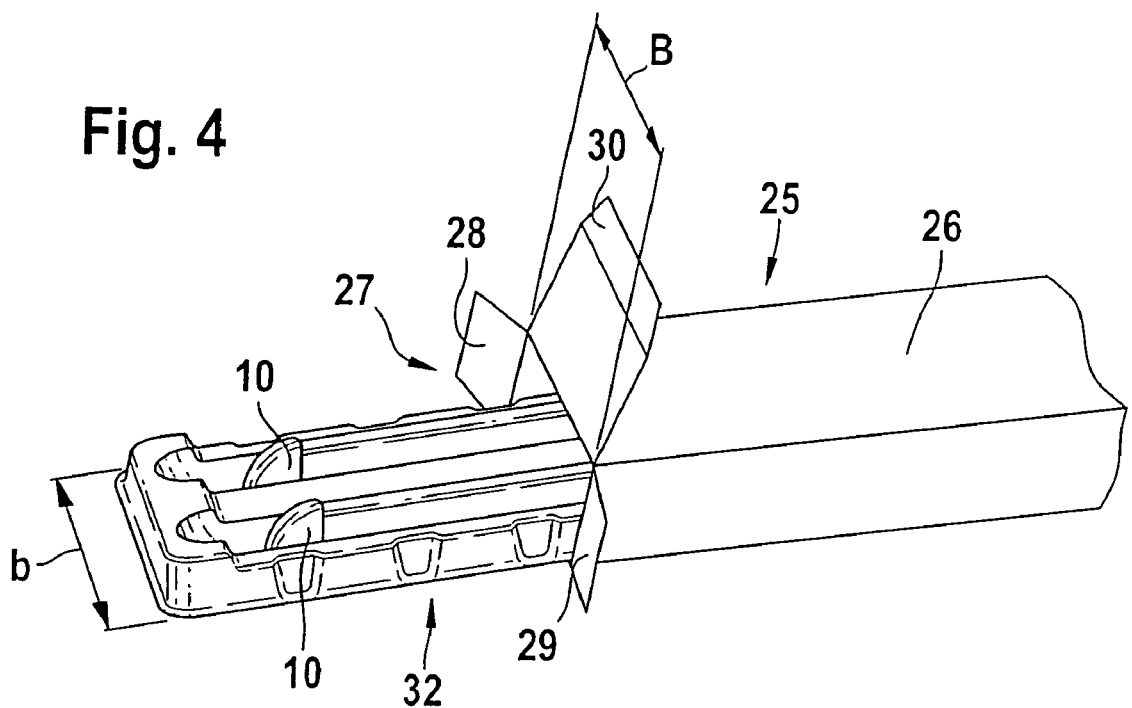
FIG. 4 A perspective view of packaging in accordance with the invention in which the wiper blades are partially removed.
Figure 5:
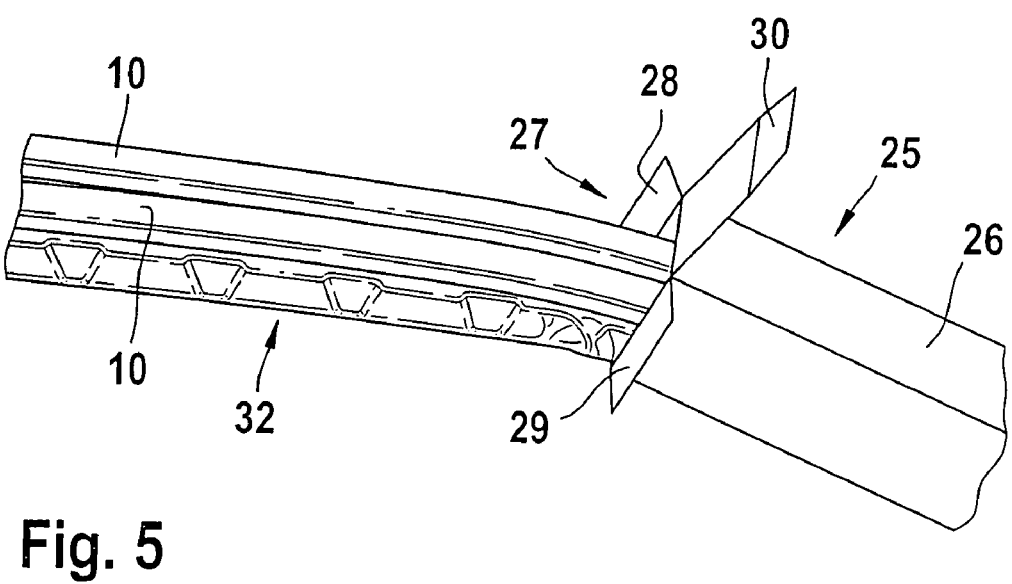
FIG. 5 The packaging in accordance with FIG. 4 in which the wiper blades are almost completely removed from the packaging, also in a perspective view.

Packaging 25 depicted in its entirety in FIGS. 4 and 5 is used to package this kind of wiper blade 10 that is embodied in a curved manner in its unstressed state so that it can be offered commercially for end users. The packaging 25 features a rectangular, folded box 26 composed of cardboard in particular, which is closed at least on its one front side 27 by means of closure flaps 28, 29, 30, whereby the closure flap 30 is embodied as a tuck-in flap.

It is essential that the folded box 25 feature a rigidity that permits the wiper blade 10 to be accommodated in the folded box 25 in an extended or almost extended state without the folded box 25 being deformed.

An insert 32 is used to position the wiper blade 10 in the folded box 25. The insert 32 in the exemplary embodiment is embodied to accommodate or position two wiper blades 10 arranged next to each other. However, inserts for one or more than two wiper blades 10 are also conceivable. The insert 32 is composed preferably of plastic and is manufactured in a deep-drawing method. The length of the insert 32 is somewhat greater than the extended length of the wiper blades 10. Embodied in the insert 32 are two receptacles 33, 34 arranged parallel to one another for the two wiper blades 10. The arrangement of the receptacles 33, 34 in the insert 32 is accomplished in such a way that the wiper blades 10 can be inserted into the receptacles 33, 34 with the wiper lips 14 against the curvature direction of the wiper blades 10, whereby the receptacles 33, 34 surround the wiper lips 14 of the wiper blades 10 at least partially and are thereby responsible for protecting the wiper lips 14 in the inserts 32. In addition, the length of the insert 32 is somewhat greater than the length of the receptacles 33, 34 so that the wiper blades 10 are accommodated in the receptacles 33, 34 in the longitudinal direction in an unmovable manner.

It is essential that the elasticity or flexural strength of the insert 32 is less than the elasticity or flexural strength of the wiper blades 10 in the curvature direction. In order to make especially high flexibility of the insert 32 possible in the curvature direction of the wiper blade 10, V-shaped cutouts 35 are embodied in the side walls of the receptacles 33, 34, which weaken the insert 32 in the curvature direction of the wiper blade 10.

In order to effect locational positioning of the insert 32 in the folded box 26 transverse to the longitudinal extension of the insert 32, the width b of the insert 32 is adapted to the inside width B of the folded box 26 or is slightly less than said inside width. The inside height of the folded box 26 depends upon the degree to which the wiper blade 10 or the wiper blades 10 are supposed to be extended in the folded box 26. It is preferred that the inside height of the folded box 26 is embodied in such a way that the wiper blade 10 or the wiper blades 10 along with the insert 32 can be accommodated in the folded box 26 in almost an extended state.

FIGS. 4 and 5 depict the situation in which the end user removes the wiper blades 10 from the folded box 26 or the packaging 25. It is essential in this case, as shown in particular in FIG. 5, that when pulling the insert 32 out, the wiper blades 10 are pulled out of the folded box 26 along with the insert 32, whereby, as a result of the curvature of the wiper blades 10, the insert 32 also deflects in the direction of the curvature of the wiper blades 10. As a result, the wiper blades 10 being held under tension in the folded box 26 do not abruptly relax or curve when being removed from the folded box 26, rather this occurs continuously when the wiper blades 10 are being removed or pulled out of the folded box 26.

In addition, reference is made to the fact that a corrugated cardboard box or a plastic blister pack or another part manufactured using a plastic method can be used instead of a folded box 26; it only has to feature the mentioned, required rigidity in the curvature direction of the wiper blade(s) 10. Of course, using a corresponding stamped element, made, for example, of corrugate cardboard or solid board, is also conceivable instead of an insert made of plastic.

The invention claimed is:

1. The combination of a wiper blade and packaging therefor, the combination comprising a wiper blade (10) for windows (20) of motor vehicles, whereby the wiper blade (10) has an elongated, elastic supporting element (16) for a wiper strip (12) that is curved in an unstressed state, the combination also comprising a packaging element (26) accommodating the wiper blade (10), the packaging element having a rigidity that causes the wiper blade (10) to extend against its curvature, so that the wiper blade is in an extended or almost extended state within the packaging element, whereby the wiper blade (10) can be inserted and removed on a front side (27) of the packaging element (26), and the combination also comprising an insert (32), wherein the wiper blade (10) together with the insert (32) can be inserted into and removed from the packaging element (26) and wherein the insert (32) features a lower flexural strength in the curvature direction of the supporting element (16) than the wiper blade (10).

2. A combination according to claim 1, characterized in that the insert (32) accommodates the wiper blade (10) at least partially in a positively engaged manner.

3. A combination according to claim 2, characterized in that the insert (32) surrounds the wiper strip (12) at least partially.

4. A combination according to claim 2, characterized in that the insert (32) is a plastic part manufactured using a deep-drawing method.

5. A combination according to claim 2, characterized in that the insert (32) features a width that corresponds approximately to the inside width of the packaging element (26).

6. A combination according to claim 2, characterized in that the packaging element is a folded box (26).

7. A combination according to claim 1, characterized in that the insert (32) surrounds the wiper strip (12) at least partially.

8. A combination according to claim 7, characterized in that the insert (32) is a plastic part manufactured using a deep-drawing method.

9. A combination according to claim 7, characterized in that the insert (32) features a width that corresponds approximately to the inside width of the packaging element (26).

10. A combination according to claim 7, characterized in that the packaging element is a folded box (26).

11. A combination according to claim 1, characterized in that the insert (32) is a plastic part manufactured using a deep-drawing method.

12. A combination according to claim 11, characterized in that the insert (32) features a width that corresponds approximately to the inside width of the packaging element (26).

13. A combination according to claim 11, characterized in that the packaging element is a folded box (26).

14. A combination according to claim 11, characterized in that the wiper blade has a longitudinal direction, and in that the insert (32) accommodates the wiper blade (10) in the longitudinal direction in an unmovable manner.

15. A combination according to claim 14, characterized in that the insert (32) features a width that corresponds approximately to the inside width of the packaging element (26).

16. A combination according to claim 14, characterized in that the packaging element is a folded box (26).

17. A combination according to claim 1, characterized in that the insert (32) features a width that corresponds approximately to the inside width of the packaging element (26).

18. A combination according to claim 17, characterized in that the packaging element is a folded box (26).

19. A combination according to claim 1, characterized in that the packaging element is a folded box (26).

20. A combination according to claim 1, wherein the insert has side walls having therein cut-outs that weaken the insert in the curvature direction of the wiper blade.

* * * * *